United States Patent
Canpolat et al.

(10) Patent No.: US 9,264,433 B2
(45) Date of Patent: Feb. 16, 2016

(54) SECURE AND AUTOMATIC CONNECTION TO WIRELESS NETWORK

(75) Inventors: Necati Canpolat, Beaverton, OR (US); Vivek Gupta, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/431,705

(22) Filed: Mar. 27, 2012

(65) Prior Publication Data

US 2013/0262850 A1     Oct. 3, 2013

(51) Int. Cl.
*H04L 29/06*  (2006.01)
*H04W 12/08*  (2009.01)
*H04L 29/08*  (2006.01)
*H04W 48/08*  (2009.01)
*H04W 76/02*  (2009.01)
*H04W 48/02*  (2009.01)

(52) U.S. Cl.
CPC .......... *H04L 63/0892* (2013.01); *H04L 63/105* (2013.01); *H04L 67/02* (2013.01); *H04W 12/08* (2013.01); *H04W 48/02* (2013.01); *H04W 48/08* (2013.01); *H04W 76/02* (2013.01)

(58) Field of Classification Search
CPC ..... H04L 63/10; H04L 63/12; H04L 63/0892; G06F 21/10; G06F 21/105
USPC ............................................. 726/4; 713/150
See application file for complete search history.

(56) References Cited

U.S. PATENT DOCUMENTS

| 6,453,159 | B1* | 9/2002 | Lewis ........................... 455/411 |
| 2003/0196107 | A1* | 10/2003 | Robertson et al. ............ 713/200 |
| 2004/0110487 | A1* | 6/2004 | Creamer ............... H04M 15/00 455/411 |
| 2004/0196978 | A1* | 10/2004 | Godfrey et al. .............. 380/270 |
| 2006/0271690 | A1* | 11/2006 | Banga ................... H04L 67/306 709/228 |
| 2008/0049649 | A1* | 2/2008 | Kozisek et al. ............... 370/310 |
| 2009/0019527 | A1* | 1/2009 | Winslow ........................... 726/4 |
| 2009/0205032 | A1* | 8/2009 | Hinton et al. ..................... 726/7 |
| 2011/0280231 | A1* | 11/2011 | Montemurro et al. ........ 370/338 |
| 2012/0184241 | A1* | 7/2012 | Heydari .............. H04L 12/1467 455/406 |

FOREIGN PATENT DOCUMENTS

WO     03/096554 A2    11/2003
WO     2009/011931 A2   1/2009

OTHER PUBLICATIONS

International Search Report and Written Opinion received for PCT Patent Application No. PCT/US2013/033687 mailed on May 15, 2013, 9 pages.

* cited by examiner

*Primary Examiner* — Peter Shaw
(74) *Attorney, Agent, or Firm* — Sutherland Asbill and Brennan LLP

(57) ABSTRACT

Described herein are systems, methods, and apparatus for automatically establishing secure connections to wireless networks using a wireless local area network access point which calls for acceptance of terms and conditions of use. During an initial connection, the user is prompted to review and accept terms and conditions associated with use of that wireless network. Once accepted, future connections at that or other access points, which use those same terms and conditions, occur free from user intervention.

20 Claims, 6 Drawing Sheets

SECURE AND AUTOMATIC CONNECTION TO WIRELESS NETWORK

TECHNICAL FIELD

This disclosure relates generally to wireless networking.

BACKGROUND

Wireless networks allow for the transfer of data between network devices. Wireless access points and corresponding wireless networks may be configured to provide access to other networks connected thereto, such as the Internet.

DETAILED DESCRIPTION

Deployment and use of wireless local area networks ("WLANs" or "wireless networks") continues to grow as demands for data access increase. Some wireless networks may be configured to provide "hotspots" or areas within the range of one or more wireless access points within which connectivity to another network, such as the Internet, is available. Different hotspots may be available free of charge to the user, for a fee, or sponsored by advertisements. Access to the wireless networks in a hotspot and subsequent access to other networks such as the Internet may be subject to a user's acceptance of terms of use. These terms of use, also known as "terms and conditions," set forth an agreement between two or more entities. For example, the agreement may be between an end user and a company providing the wireless network. These terms of use may delineate appropriate use, fees, monitoring policies, usage limits, and so forth.

Some entities provide hotspots at many locations. Similarly, a given hotspot may be serviced by several different wireless networks. Traditional systems have required users to accept the terms of use each time they connect to a wireless network at a location. This is especially true of WLANs that provide free access such as in airports, museums and other public places. In some situations, these traditional systems may erroneously make a connection appear usable for access to another network, such as the Internet, when it is not. For example, a user may be shown as being connected to an access point in the hotspot, but may not have seen a presentation of terms of use. Even though appearing to be connected, traffic to an Internet-based email server will fail. As a result, user dissatisfaction and support costs may increase, as well as traffic on other networks such as wireless wide area networks ("WWANs") may increase due to an inability to successfully or easily take advantage of connectivity provided at hotspots. This situation, in turn, may result in higher costs for the users as data is transferred on the more expensive WWANs.

Described herein are systems and methods for providing secure automatic connection to wireless networks. Once a user accepts the terms of use, the system provides for automatic connectivity until such time as the terms of use have been modified. The following system may, in some implementations, be incorporated into or used in conjunction with the technical standard IEEE 802.11u-2011 published Feb. 25, 2011 and promulgated by the Institute of Electrical and Electronics Engineers ("IEEE") of New York, N.Y., USA, or features available in products certified by the WiFi Alliance of Austin, Tex., USA such as those compliant with the "Hotspot 2.0" standard.

Figure 1:
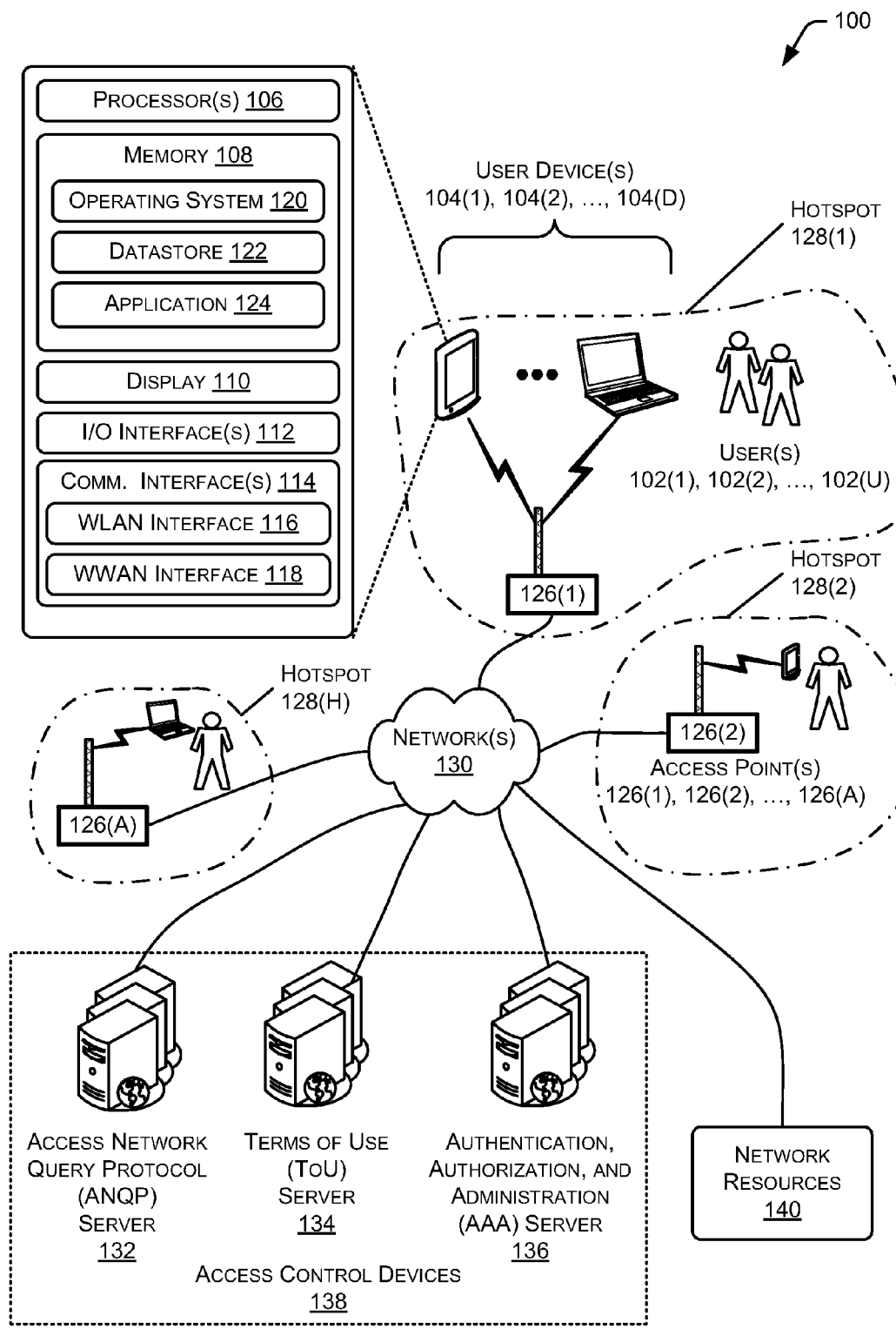
FIG. 1 illustrates a system to provide secured automatic connection to a wireless access point in accordance with an embodiment of the disclosure.

FIG. 1 illustrates a system 100 to provide secure automatic connection to a wireless access point. One or more users 102(1), 102(2), . . . , 102(U) are shown here. As used herein, letters enclosed by parenthesis such as "(U)" indicate an integer having a value greater than zero. Each of these users 102 may have one or more user devices 104(1), 104(2), . . . , 104(D). The user devices 104 may include smartphones, laptops, desktops, tablet computers, game consoles, and so forth. The user devices 104 comprise one or more processors 106, one or more memories 108, one or more displays 110, one or more input/output ("I/O") interfaces 112, and one or more communication interfaces 114.

The one or more processors 106 may each comprise one or more cores configured to access and execute at least in part instructions stored in the one or more memories 108. The one or more memories 108 comprise one or more computer-readable storage media ("CRSM"). The one or more memories 108 may include, but are not limited to, random access memory ("RAM"), flash RAM, magnetic media, optical media, and so forth. The one or more memories 108 may be volatile in that information is retained while providing power or non-volatile in that information is retained without providing power.

The display 110 is configured to present visual information to the user 102. The display 110 may comprise a liquid crystal display, plasma display, cathode ray tube, light emitting diode, and so forth.

The one or more I/O interfaces 112 may also be provided in the user device 104. These I/O interfaces 112 allow for devices, such as keyboards, joysticks, touch sensors, cameras, microphones, speakers, external memories, and so forth, to be coupled to the user device 104.

The one or more communication interfaces 114 provide for the transfer of data between the user device 104 and another device. The communication interfaces 114 may include, but are not limited to, a wireless local area network ("WLAN") interface 116, a wireless wide area network ("WWAN") interface 118, a wireless personal area interface ("WPAN"), (and so forth. In some implementations, the WLAN interface 116 may comply with at least a portion of the IEEE 802.11u standard. In some implementations, the WWAN interface 118 may be configured to couple to a mobile telecommunication cellular network. The communication interfaces 114 may utilize acoustic, radio frequency, optical, electrical, magnetic, or other signals to exchange data between the user device 104 and another device such as an access point.

The one or more memories 108 may store instructions for execution by the processor 106 to perform certain functions, actions, or operations. These instructions may include an operating system 120 configured to manage hardware resources such as the I/O interfaces 112 and to provide various services to applications executing on the processor 106. The one or more memories 108 may also store a datastore 122 containing information about the operating system, configuration files, files indicative of acceptance to terms of service such as cookies, information about wireless networks, and so forth.

One or more applications 124 are stored in the one or more memories 108. One or more of the applications 124 may be configured to scan for, identify, and connect to wireless networks; present terms of use; receive user input; and so forth. The application 124 may provide or utilize a user interface presented with the display 110 or another output device coupled to the I/O interface 112.

The WLAN interface 116 of the user device 104 communicates using a wireless connection with one or more access points 126(1), 126(2), . . . , 126(A). The access points may comprise one or more processors, memories, communication interfaces, antennas, and so forth. The one or more access points 126 provide one or more hotspots 128(1), 128(2), . . . , 128(H). Each hotspot 128 is an area defined by a distance within which bidirectional communication between the user device 104 and one or more of the access points 126 may occur. The boundaries of the hotspot 128 may be defined by a radiation pattern of the antennas, shielding, and so forth. For example, a hotspot 128 may be provided within a coffee shop such that the user devices 104 inside the coffee shop or immediately adjacent may establish a wireless connection with the access point 126.

In this illustration, access points 126(1), 126(2), and 126 (A) are shown. Each of these access points 126 are configured to communicatively couple to the user devices 104 which are proximate thereto, defining hotspots 128(1), 128(2) and 128 (H), respectively. In some implementations a single location may be served by wireless networks. For example, in an airport terminal several access points 126 operated by different entities may provide coverage to the same physical area. In another implementation, several different wireless networks may be supported from one access point 126. For example, those different entities may collocate and use common access points to provide coverage.

The wireless networks established by one or more access points 126 are communicatively coupled to another, or to a second network 130. For example, the access points 126 may be connected to a router coupled to the Internet. The network 130 may comprise a hardwired network, another wireless network, or a combination thereof. The network 130 may comprise a plurality of interconnected computer networks. For example, the network 130 may comprise the Internet, or a network coupled to the Internet. In another implementation, the network 130 may comprise a private network or a virtual private network. In some implementations, the network 130 may exchange data using transmission control protocol ("TCP"), internet protocol ("IP"), or a combination of TCP and IP.

Communicatively coupled to the network 130 are various devices and servers. These may include an access network query protocol ("ANQP") server 132, a terms of use ("ToU") server 134, an authentication, authorization, and administration ("AAA") server 136, and so forth. For ease of illustration and not by way of limitation, these three devices may be referred to as access control devices 138. The network 130 may also be coupled to other network resources 140 including, but not limited to, cloud resources, servers, input/output devices, and so forth. For example, the network resources 140 may include a virtual private networking ("VPN") server, email service provider, corporate portal, and so forth.

The ANQP server 132 is configured to respond to and participate in access network query protocol requests. This may include a query and response protocol which provides the user device 104 with information about the wireless network available at the hotspot 128. This information may include, but is not limited to, the domain name of an operator of the hotspot, roaming partners, authentication methods supported, and so forth. Operation of the ANQP server 132 is discussed below in more detail with regard to FIG. 2. In some implementations, the ANQP server 132 may be co-located with the access point 126 as well and other embodiments are also possible.

The ToU server 134 is configured to maintain terms of use information associated with the wireless networks at the hotspots 128. This information may include documents such as service level agreements, terms and conditions, end user license agreements, geographic areas associated with the documents, expiration dates, implementation dates, and so forth. The ToU server 134 is configured to maintain version number information associated with the documents. This version number allows distinction between different iterations of the terms of use, for example when new terms of use supersede old terms of use. In one implementation, the ToU server 134 may provide version control of the terms of use. In another implementation, version control may be provided by another server. The ToU server 134 may provide the terms of use information in various formats including, but not limited to, hypertext markup language ("HTML"), extensible markup language ("XML"), plain text, and so forth. The ToU server 134 is configured to receive and respond to requests for terms of use information. The ToU server 134 may also be configured to generate files indicative of the user's 102 acceptance of the terms of use. In one implementation, this file may comprise a cookie which is provided to the user device 104. In another implementation, the ToU server 134 may maintain a datastore indicating which user devices 104, users 102, or combinations thereof have accepted terms of use. The ToU server 134 may also be configured to provide a signal or data to the access point 126, or another access control device such as a router, so that the user device 104 associated with the acceptance of the terms of use is transitioned from limited access to non-limited access. Operation of the ToU server 134 is discussed below in more detail with regard to FIG. 2.

The AAA server 136 is configured to provide services such as authentication, authorization, administration, or a combination thereof to the user devices 104. The AAA server 136 may be configured to provide authentication of the identity of the user device 104 or the user 102 associated therewith. The AAA server 136 may determine what level of access is permitted, what actions are authorized, and so forth. The AAA server 136 may also maintain usage and accounting records such as duration of the use of the hotspot 128 and billing associated with use of the hotspot. In one implementation, the AAA server 136 may support a robust security network ("RSN") transaction to establish a wireless encrypted connection between the user device 104 and the access point 126. The RSN transaction may be compliant with the IEEE 802.11i standard or Wi-Fi Protected Access II protocol ("WPA2"). Operation of the AAA server 136 is discussed below in more detail with regard to FIG. 2.

The access control devices 138 are configured to manage access by the user devices 104 to the access points 126, the network 130, and in some implementations the network resources 140. This access may be limited or non-limited. Limited access as used herein describes when communications are permitted between the user device 104 via the access point 126 and one or more of the access control devices 138, but disallowed for the network resources 140. Thus, when the user device 104 is subject to limited access, it is unable to access the network resources 140 but may still communicate with the access control devices 138. In one implementation, limited access may be enforced with access control lists, port blocking, and so forth.

Non-limited access as used herein describes when communications between the user device 104 and the network resources 140 via the access points 126 are permitted. In some implementations, non-limited access may be subject to traffic shaping, content filtering, and so forth. For example, the user device 104, which has been permitted non-limited access, may be able to establish a VPN connection with a corporate server and browse a news website, but may blocked from accessing an offshore gambling website by content filtering software.

As described herein, the servers or other devices may include, but are not limited to, processors, memories, communication interfaces, I/O devices, and so forth. It is understood that in some implementations, various functions may be combined or distributed in various ways. For example, the access point 126 may provide the functions described with regard to the ANQP server 132, the ToU server 134, the AAA server 136, and so forth. The servers described herein may comprise physical servers, virtual server instances executing on a physical server, or a combination thereof.

Also, in some implementations, the access control devices 138 may be accessible to the access points 126 by way of a local or wide area network separate from the network 130. For example, the access control devices 138 may be disposed inside or behind a firewall which, in turn, provides connectivity to the network 130. In this example, the access points 126 and the access control devices 138 couple to a private network, which, in turn, couples to the network 130. As described, access to the network 130, and subsequently the network resources 140 coupled thereto, may be conditional upon acceptance of terms of use associated with the wireless network.

Figure 2:
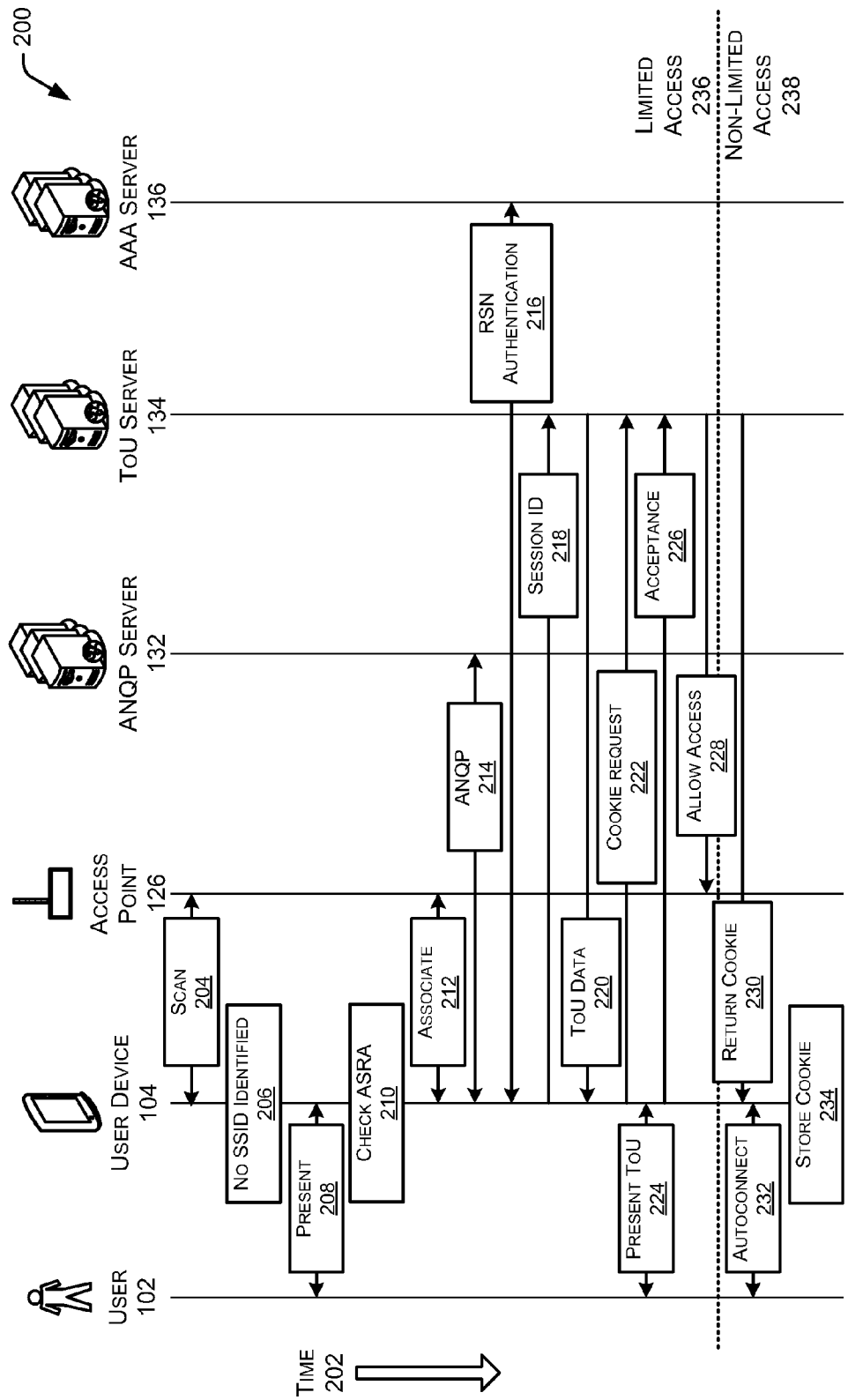
FIG. 2 illustrates a message exchange diagram for connection to a wireless network and acceptance of terms of use associated therewith, in accordance with an embodiment of the disclosure.

FIG. 2 illustrates a message exchange diagram 200 for connection to a wireless network and acceptance of terms of use associated therewith, in accordance with an embodiment of the disclosure. In this diagram, time increases along the direction of arrow 202, down the page. Represented are the user 102, the user device 104, the access point 126, the ANQP server 132, the ToU server 134, and the AAA server 136.

At 204, the user device 104 scans for wireless networks. This scan may include listening on one or more pre-determined channels or frequencies. In some implementations, the scan may include transmitting a signal configured to elicit a response from one or more access points 126. The scan may be initiated by the user 102, by a process executing on the processor 106 of the user device 104, and so forth. For example, the user 102 may initiate a web browsing session on the user device 104, which, in turn, attempts to connect to the Internet. Information is acquired about the wireless networks which are in range. This information may include service set identifier ("SSID"), homogenous extended service set identifier ("HESSID"), access point media access control ("MAC") address, and so forth.

At 206, the information from the scan is processed to determine networks for which connection credentials have been previously acquired. As shown here, no SSID has been identified for which connection credentials are available on the user device 104.

At 208, at least partly in response to this lack of identified networks, the user 102 may be presented with a list of the wireless networks detected by the scan. The user 102 may select one of the wireless networks detected by the scan to attempt a connection to. In some implementations, the list of wireless networks may include information provided by the IEEE 802.11u internetworking Information Element ("IE") Access Network type field. This field may be used to indicate wireless networks which are available at no charge, available for a fee, and so forth.

At 210, the user device 104 checks the IE Additional Steps Required for Access ("ASRA") field. Entries in this field are used to indicate that additional steps are called for to establish a connection. For example, that terms of use are required.

At 212, the user device 104 associates itself with the wireless network by communicating at least with the access point 126. Where the RSN is enabled, at 214, an access network query protocol message exchange may take place between the user device 104 and the ANQP server 132. For example, the user device 104 may send an ANQP message containing an "Anonymous Network Access Identifier" and "Network Authentication Type" requests. The ANQP server 132 returns to the user device 104 responses for both requests including an "Anonymous NAI Element" and a "Network Authentication Type." If the "Network Authentication Type" query response indicates that acceptance of the terms of use is required for non-limited access to the network resources 140, connection information such as an internet protocol ("IP") address, uniform resource locator ("URL"), and so forth may be returned. For example, the response may include the URL of the ToU server 134.

At 216, the user device 104 engages in RSN authentication using the anonymous authentication information acquired during 214. This transaction may take place between the user device 104 and the AAA server 136. Once the RSN authentication is configured, subsequent communications between the user device 104 and the access point 126 are encrypted. This encryption aids in protecting the privacy of data transmitted over the air. In other implementations, previously stored encryption credentials may be used to establish the encrypted connection between the user device 104 and the access point 126.

At 218, the user device 104 provides information to the ToU server 134 identifying the user device 104. As described above, the user device 104 may determine or retrieve the address of the ToU server 134 using information provided by the ANQP transaction 214. In one implementation, the user device 104 may initiate a hypertext transfer protocol secure ("HTTPS") POST message to the ToU server 134 using the URL drawn from the Network Authentication Type ANQP message concatenated with a session identification ("ID"). This session ID number may be used by the ToU server 134 to correlate various sessions as originating from the same user device 104.

In one implementation, the format of the URL string posted to the ToU server 134 may be as follows:
https://touserver.example.com&sessionID=ODYzOTY3MTMx In this sample URL string, "https://touserver.example.com" is an example URL of the ToU server 134, "&sessionID=" is the exact string to append to the URL specifying the session ID parameter, and "ODYzOTY3MTMx" is the base64 encoded string of a 32-bit random number (session ID value) generated by the user device 104.

In some implementations, the user device 104 may be configured to maintain the HTTP User Agent field in an HTTP header to reflect the browser application used to render the terms of use to the user 102. With this information, the ToU server 134 may then interpret the HTTP User Agent field to determine the display capability of the user device 104 and provide the terms of use in a format suited to a user interface.

At 220, the ToU server 134 returns the terms of use data to the user device 104. This information may include documents such as service level agreements, terms and conditions, end user license agreements, geographic areas associated with the documents, expiration dates, implementation dates, and so forth. These documents may be provided as one or more files including, but not limited to, content types such as "text/html," "application/xml," and "application/xhtml+xml." In some implementations, this may include contact information associated with the user 102.

At 222, the user device 104 requests preparation of a file indicative of user acceptance, such as an opaque cookie, from the ToU server 134. In some implementations, this transaction may use asynchronous Simple Object Access Protocol ("SOAP") messages over HTTPS which may include the session ID. In some implementations, the user device 104 may begin polling the ToU server 134 until a response is received by the ToU server 134, such as from the user, or a timeout limit is reached. The following operation, at 224, may be configured to run concurrently with the operation at 222.

At 224, the user device 104 presents the terms of use to the user 102. For example, the terms of use may be presented on the display 110, played using speakers coupled to the I/O interface 112, and so forth. The user 102 may indicate acceptance of the terms of use with an input device such as a touch screen, button, and so forth coupled to the I/O interface 112. In some implementations, the user 102 may also enter information such as a username, password, contact information, and so forth.

At 226, the user device 104 provides the ToU server 134 with an indication of acceptance to the terms of use. In one implementation, this may comprise an HTTPS POST transaction between the user device 104 and the ToU server 134 which contains the user's acceptance, session ID, and so forth.

At 228, the ToU server 134 acknowledges the user's acceptance of the terms of use, and updates data stored therein which is associated with the user device 104. At least partly in response to the receipt of the user's acceptance, the ToU server 134 is configured to enable non-limited access by the user device 104 to the network resources 140 via the wireless network. In some implementations, the ToU server 134 may communicate with the access point 126, routers, firewalls, or other network devices to enable the non-limited access. In some implementations, based at least in part on a particular version of the terms of use agreed to, some intermediate level of access may be provided to the network resources 140. For example, a terms of use which invokes stricter content filtering at a firewall may be made available to minors.

The ToU server 134 may then generate a cookie or other file indicative of acceptance of the terms of use. This file may include a version number of the terms of use, user information, and metadata. In some implementations, the metadata may comprise a digital signature, configured to render the file tamper-resistant. In one implementation, the file may comprise an opaque cookie. An opaque cookie is one in which the information present therein is not meaningful to applications executing on the user device 104. This lack of meaning may result from the application not being configured to interpret the information in the cookie, because the cookie is encrypted, or a combination thereof.

At 230, the ToU server 134 returns the file indicative of acceptance, such as a cookie, to the user device 104. At 232, the user device 104 may be configured to prompt the user 102 to select whether to automatically connect to this wireless network in the future. Automatic connection is described in more detail below with regard to FIG. 3.

At 234, the user device 104 stores the file indicative of acceptance in the memory 108. This file may be associated with identifying information associated with the wireless network. For example, the file may be associated with the SSID, HESSID, and so forth of the hotspot 128.

As depicted in this illustration, the user device 104 was subject to limited access 236 to the ToU server 134 until the ToU server 134 indicated otherwise. As shown here, following the user's acceptance of the terms of use, the ToU server 134 permitted the user device 104 to transition to non-limited access 238. As described above, the non-limited access 238 permits the user device 104 access to at least part of the network resources 140.

Figure 3:
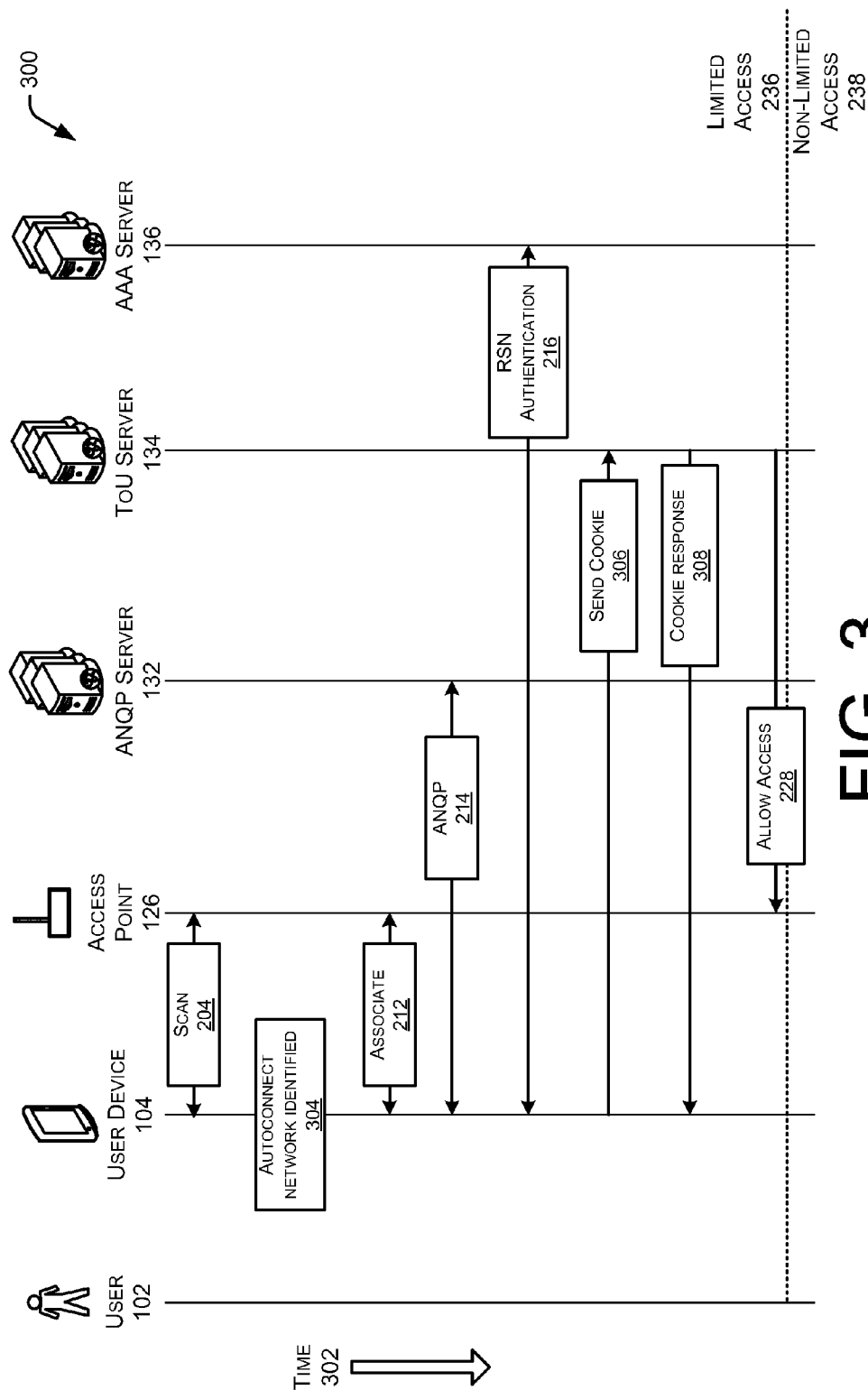
FIG. 3 illustrates a message exchange diagram for connection to a wireless network using previously accepted terms of use, in accordance with an embodiment of the disclosure.

FIG. 3 illustrates a message exchange diagram 300 for connection to a wireless network using previously accepted terms of use. For example, as set forth above, the user 102 may have previously agreed to a version of the terms of use which are in effect. In another implementation, the user may have agreed to the terms of use in another transaction or using another interface. For example, the user 102 may purchase from an entity a new user device 104, such as a smartphone, and agree to terms of use associated with that phone. These terms of use may include terms of use for providing wireless access via hotspots 128 provided by or affiliated with the entity. As a result, in this implementation, the user 102 may have accepted the terms of use for the hotspot 128 prior to an attempted connection to the wireless network of the hotspot 128.

In this diagram, time increases along the direction of arrow 302, down the page. Represented are the user 102, the user device 104, the access point 126, the ANQP server 132, the ToU server 134, and the AAA server 136.

As above, at 204, the user device 104 scans for wireless networks. At 304, an autoconnect hotspot network is identified. The autoconnect network is identified as being a wireless network for which the user has accepted the terms of use and has configured for automatic connection in the future.

As above, at 212, the user device 104 associates with the access point 126. Also as above, where RSN is enabled, at 214 the ANQP exchange may take place between the user device 104 and the ANQP server 132. At 216, the user device 104 engages in RSN authentication using the anonymous authentication information acquired during 214. This transaction may take place between the user device 104 and the AAA server 136.

At 306, the user device 104 sends a copy of the file indicative of acceptance to the ToU server 134. For example, the user device 104 may retrieve from the memory 108 a copy of a cookie stored as part of a previous acceptance to terms of use associated with the wireless network. The user device 104 may determine the address of the ToU server 134 from the ANQP exchange as described above, retrieve it from the memory 108, determine it from contents of the cookie, and so forth.

At 308, the ToU server 134 analyzes the information in the file indicative of acceptance to determine whether the acceptance is still valid. This may include a comparison to a previously issued file, retrieving information from a datastore, retrieving a version number from the received file and comparing with a current version number, and so forth. In this illustration, the ToU server 134 has indicated that the file indicative of acceptance remains valid, and provides a response to the user device 104.

At 228, as described above, the access point 126 or other device coupled to the wireless network is configured to allow non-limited access 238 to the user device 104. As illustrated here, the user device 104 was able to automatically establish a secured connection with a wireless network which requires acceptance of terms of use. Thus, the user 102 experiences seamless connectivity with the user device 104 when in the hotspot 128.

Figure 4:
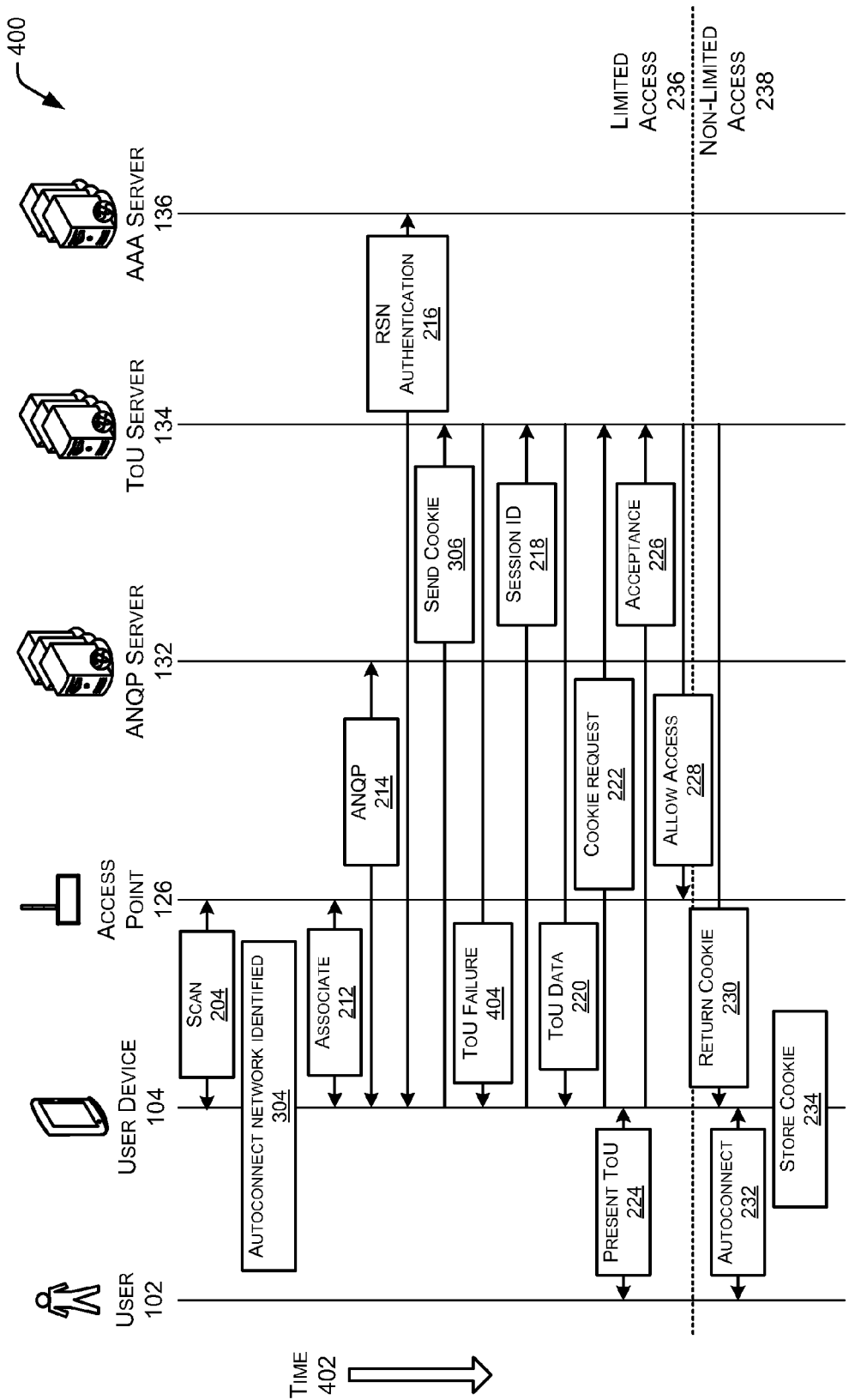
FIG. 4 illustrates a message exchange diagram for connection to a wireless network when the terms of use have changed, in accordance with an embodiment of the disclosure.

FIG. 4 illustrates a message exchange diagram 400 for connection to a wireless network when the terms of use have changed. As described above, the terms of use may change. These changes may result from expansion into new geographic areas, changes in the law, addition of new services, and so forth. The ToU server 134 is configured to maintain, or communicate with another server configured to maintain, version control over the terms of use. In one implementation, each change to the terms of use may result in an increment to a version number associated with the terms of use. These changes may include the addition or removal of text, formatting changes, and so forth.

In this diagram, time increases along the direction of arrow 402, down the page. Represented are the user 102, the user device 104, the access point 126, the ANQP server 132, the ToU server 134, and the AAA server 136.

As above, at 204, the user device 104 scans for wireless networks. At 304, an autoconnect network is identified. The autoconnect network is identified as being a wireless network for which the user has accepted the terms of use and has configured for automatic connection in the future.

As above, at 212, the user device 104 associates with the access point 126. Also as above, where RSN is enabled, at 214, the ANQP exchange may take place between the user device 104 and the ANQP server 132. At 216, the user device 104 engages in RSN authentication using the anonymous authentication information acquired during 214. This transaction may take place between the user device 104 and the AAA server 136.

At 306, the user device 104 sends a copy of the file indicative of acceptance to the ToU server 134. For example, the user device 104 may retrieve from the memory 108 a copy of a cookie stored as part of a previous acceptance to the terms of use associated with the wireless network. The user device 104 may determine the address of the ToU server 134 from the ANQP exchange as described above, retrieve it from the memory 108, determine it from contents of the cookie, and so forth. The retrieved cookie is associated with the particular version of the terms of use in effect at the time of acceptance. In some implementations, the user device 104 may send a request for access rather than a file indicative of acceptance. For example, the information associated with previous acceptance may be stored on the ToU server 134.

At 404, the ToU server 134 has inspected the file indicative of acceptance, or retrieved data associated with acceptance, and determined that the acceptance is no longer valid or has otherwise failed. The acceptance may be no longer valid due to a change in the version of the terms of use, an expiration date specified in the terms of use, and so forth. The ToU server 134 returns data indicating this failure to the user device 104.

Upon receiving the data indicating failure to agree to the terms of use, at 218, the user device 104 may provide session ID information and request from the ToU server 134 information about currently required terms of use. The ToU server 134 may respond at 220 with the ToU data. As described above, at 224, the currently required terms of use are presented to the user 102. Acceptance 226 from the user 102 may be given and received by the ToU server 134, which proceeds to allow access at 228.

As also described above, the ToU server 134, at least partly in response to the acceptance, may provide the user device 104 with an updated file indicative of acceptance at 230. At 232, the user 102 may be presented with the option to auto-connect in the future to this network. Once approved, at 234, the updated file indicative of the response is stored in the memory 108. As described above, in some implementations, data indicative of acceptance may be stored at the ToU server 134 or elsewhere.

Figure 5:
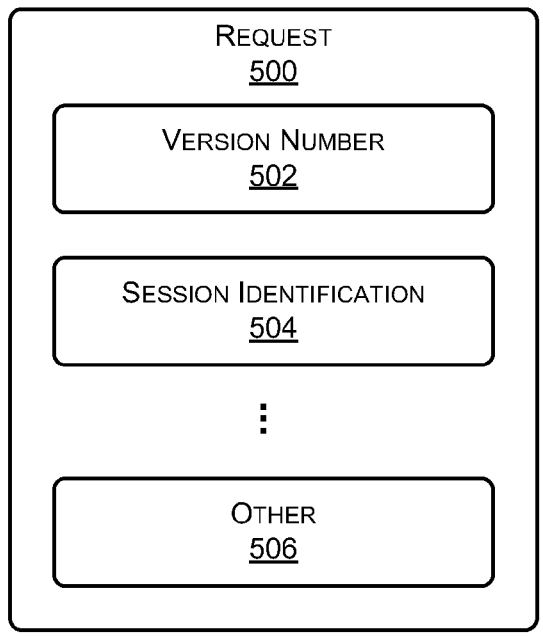
FIG. 5 illustrates a block diagram of the contents associated with a request for a file indicative of acceptance, in accordance with an embodiment of the disclosure.

FIG. 5 illustrates a block diagram of the contents associated with a request 500 for a file indicative of acceptance. The request 500 may be sent as one or more files. The user device 104 may provide the request 500 to the ToU server 134 or another device. This file may be sent as part of the transaction 222 described above.

The request 500 may include a version number 502, session ID 504, and other information 506. The version number 502 may indicate a particular set of terms of use. In some implementations, the version number 502 may be provided as part of a subscription provisioning protocol ("SPP"). The SPP may be configured to administer and provide version numbers associated with changes to the terms of use. In one implementation, the SPP version number may be chosen by a subscription server based at least in part on a "supportedSP-PVVersions" element of a "sppPostDevData" message.

The session ID 504 may be generated by the user device 104. As described above, the session ID 504 allows the ToU server 134 to associate a particular transaction with a particular user device 104. The user device 104 may be configured to utilize this session ID during HTTP connections to provide for this association. Other information 506 may be included, such as an expected duration of access, maximum fee authorized, listing of services access is being requested for, and so forth.

In some implementations, the other information 506 may include a tcCookie value as described below. This may be used to identify a particular response. The tcCookie may comprise a base64 encoded string.

Figure 6:
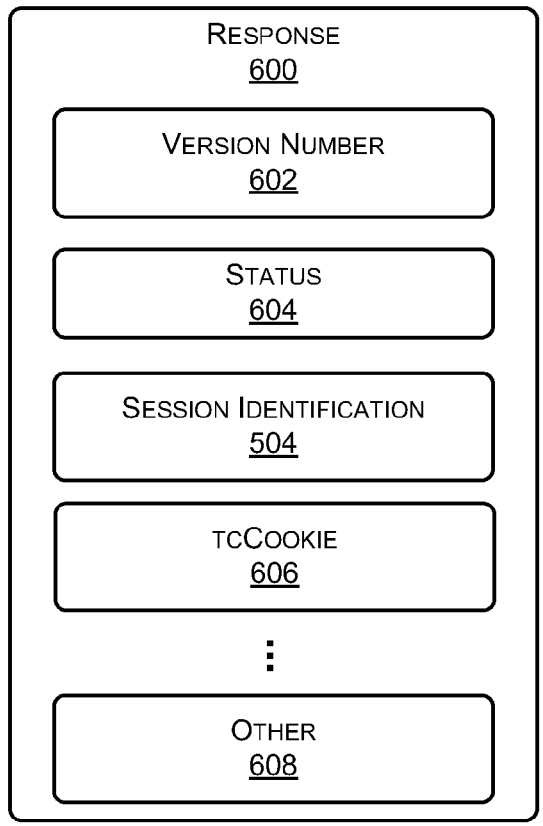
FIG. 6 illustrates a block diagram of the contents associated with a response for a file indicative of acceptance, in accordance with an embodiment of the disclosure.

FIG. 6 illustrates a block diagram of the contents of a response 600 for a file indicative of acceptance. The response 600 may be sent as one or more files. The user device 104 may receive from the ToU server 134, or another device, this file indicative of acceptance by the user 102 of the terms of use associated with the wireless network. This file may be received as part of the transaction 230 described above.

The response 600 may include a version number 602, a status 604, the session identification 504, a tcCookie 606, and other information 608. The version number 602 may indicate a particular set of terms of use which are in effect at the time connectivity is requested. As described above, in some implementations, the version number 602 may be provided as part of an SPP transaction.

The status 604 may be used to indicate a status associated with providing the response 600. The session identification 504 in the response 600 is that described above with regard to FIG. 5, and provides a common point of reference which may be used to associate the user device 104 with the acceptance of the terms of use.

The tcCookie 606 may also be included in the response 600. This may be a string generated by the ToU server 134. In some implementations, this value may be based at least in part on the session identification 504. The tcCookie 606 may be configured so that it is opaque to the user device 104.

Other information 608 may also be included in the response 600 such as error codes associated with the response, the duration access that is granted. and so forth. For example, when the response 600 indicates non-acceptance of the terms and conditions, the error code may indicate this condition.

Figure 7:
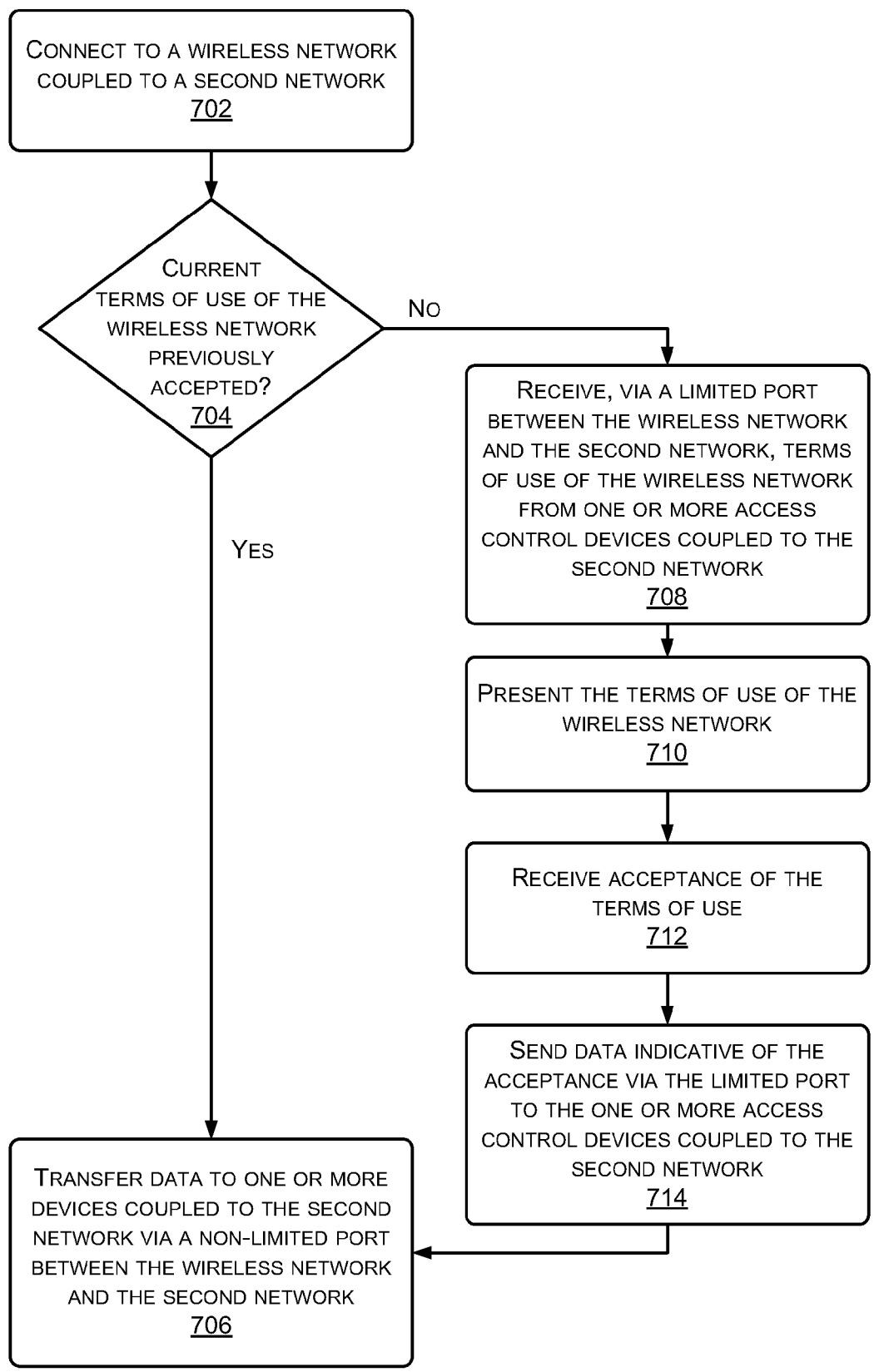
FIG. 7 is a flow diagram of an illustrative process of automatically connecting to a wireless network, in accordance with an embodiment of the disclosure.

FIG. 7 is a flow diagram of an illustrative process 700 of automatically connecting to a wireless network, in accordance with an embodiment of the disclosure. This process may be implemented by the user device 104 in some implementations.

Block 702 connects to a wireless network coupled to second network. The second network may comprise a plurality of interconnected computer networks. For example, the WLAN interface 116 in the user device 104 may wirelessly connect to the access point 126(1) of the hotspot 128(1). The access point 126(1), in turn, is coupled to the network 130 which provides access to the access control devices 138 and the network resources 140. As described above, the connection may involve an ANQP transaction, RSN transaction, and so forth.

Block 704 determines whether the current terms of use associated with the wireless network have been previously accepted. The terms of use comprise an agreement between two or more entities, such as the user and an operator of the wireless network. The terms of use are previously accepted when they have been agreed to by the user 102, an authorized delegate of the user 102, a parent, a guardian, a supervisor, or received from the user device 104 associated with the user 102. As described above, this may include acceptance using the user device 104, or acceptance via another avenue, such as purchase of a smartphone.

When block 704 determines the current terms of use have been previously accepted, the process may proceed to block 706. Block 706 transfers data to one or more devices coupled to the second network via a non-limited access connection between the wireless network and the second network. The non-limited access connection provides the non-limited access described above. For example, where the first network comprises the wireless network and the second network comprises the Internet, the user device 104 may now access the network resources 140 via the Internet.

Returning to block 704, when the current terms of use associated with the wireless network are not accepted, the process proceeds to block 708. The terms of use may not be accepted due to the user 102 not having accepted the terms of use before, from a previous declining use of the terms of use, due to changes to the terms of use, and so forth.

Block 708 receives, via a limited access connection between the wireless network and the second network, the terms of use of the wireless network from one or more access control devices coupled to the second network. For example, the user device 104 may receive the terms of use data from the ToU server 134. In other implementations, the terms of use may be stored in other devices, such as being cached at the access point 126.

Because of the limited access connection, the user device 104 at this point is unable to connect to the network resources 140. As described above, the limited access connection is configured to allow passage of data traffic to the one or more access control devices 138 and to prevent passage of data traffic to other devices, such as the network resources 140. As also described above, the one or more access control devices 138 may comprise one or more of an access point 126, an ANQP server 132, a ToU server 134, and one or more AAA servers 136.

Block 710 presents at least a portion of the terms of use. The terms of use may be presented to the user 102, an authorized delegate of the user 102, a parent, a guardian, a supervisor, and so forth.

Block 712 receives acceptance of the terms of use as presented. For example, the user 102 may use one or more input devices of the user device 104, such as a keyboard, touch screen, voice input, and so forth, to indicate acceptance of the terms of use. When the user 102 does not indicate acceptance, such as through no response or with a negative response, the limited access may be continued. In another implementation, failure to accept may result in discontinuation of the limited access.

Block 714 sends data indicative of the acceptance via the limited access connection to the one or more access control devices 138 coupled to the second network. For example, the user device 104 may send acceptance as described above with regard to acceptance at block 226. Following this, the user device 104 may be granted non-limited access, and the process proceeds to block 706.

In some implementations, after completion of block 714, a file indicative of acceptance, such as a cookie, may be received from the one or more access control devices 138 via the limited access connection. This file may then be stored in the memory 108 of the user device 104.

CONCLUSION

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

Certain aspects of the disclosure are described above with reference to block and flow diagrams of systems, methods, apparatuses, and/or computer program products according to various implementations. It will be understood that one or more blocks of the block diagrams and flow diagrams, and combinations of blocks in the block diagrams and the flow diagrams, respectively, can be implemented by computer-executable program instructions. Likewise, some blocks of the block diagrams and flow diagrams may not necessarily need to be performed in the order presented, or may not necessarily need to be performed at all, according to some implementations.

These computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable storage media or memory that can direct a computer or other programmable data processing apparatus to function in a particular manner, such that the instructions stored in the computer-readable storage media produce an article of manufacture including instruction means that implement one or more functions specified in the flow diagram block or blocks. As an example, certain implementations may provide for a computer program product, comprising a computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language is not generally intended to imply that features, elements, and/or operations are in any way required for one or more implementations or that one or more implementations necessarily include logic for deciding, with or without user input or prompting, whether these features, elements, and/or operations are included or are to be performed in any particular implementation.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

What is claimed is:

1. An apparatus comprising:
   at least one output interface;
   at least one user input interface;
   at least one wireless network interface;
   at least one memory storing computer-executable instructions; and
   at least one processor configured to access the at least one output interface, the at least one user input interface, the at least one wireless network interface, and the at least one memory and execute the computer-executable instructions to:
      receive information associated with one or more wireless networks;
      determine that a wireless network of the one or more wireless networks is designated for autoconnection, wherein the determination is based at least in part on identification, using the information, of a previous acceptance of terms of use associated with the wireless network;
      associate the at least one wireless network interface with the wireless network designated for autoconnection;
      establish a connection via the at least one wireless network interface and the wireless network to a server; and
      provide, to the server via the connection, a file indicative of the previous acceptance of the terms of use associated with the wireless network designated for autoconnection, wherein the file includes a version number associated with the previous acceptance of the terms of use.

2. The apparatus of claim 1, further comprising receiving connection information designating the server from an access network query protocol transaction.

3. The apparatus of claim 1, wherein the connection between the at least one wireless network interface and the wireless network is encrypted.

4. The apparatus of claim 1, the instructions further configured to provide access to a second network coupled to the wireless network based at least in part on the file indicative of the previous acceptance of the terms of use.

5. The apparatus of claim 1, the instructions further configured to receive a response indicating approval of the file.

6. The apparatus of claim 1, the file indicative of the previous acceptance of the terms of use comprising a version number, a session identification, and a digital signature.

7. The apparatus of claim 1, the instructions further configured to:
   receive a response from the server indicating disapproval of the file;
   at least partly in response to the disapproval, provide a session identifier to the server via the connection;
   receive a version of the terms of use associated with the use of the selected wireless network from the server via the connection;
   present at least a portion of the terms of use on the at least one output interface;
   receive, from the at least one user input interface, acceptance of the terms of use;
   communicate the acceptance to the server via the connection;
   receive, from the server via the connection, an updated file indicative of the acceptance; and
   store the updated file indicative of the acceptance in the at least one memory.

8. A method comprising:
   receiving, by a computer system comprising one or more processors, information associated with one or more wireless networks;
   determining, by the computer system, that a wireless network of the one or more wireless networks is designated for autoconnection, wherein the determination is based at least in part on identification, using the information, of a previous acceptance of terms of use associated with the wireless network;
   associating, by the computer system, at least one wireless network interface with the wireless network designated for autoconnection;
   establishing, by the computer system, a connection via the at least one wireless network interface and the wireless network to a server; and
   providing, by the computer system, to the server via the connection, a file indicative of the previous acceptance of the terms of use associated with the wireless network designated for autoconnection, wherein the file includes a version number associated with the previous acceptance of the terms of use.

9. The method of claim 8, further comprising, by the computer system, receiving connection information designating the server from an access network query protocol transaction.

10. The method of claim 8, wherein the connection between the at least one wireless network interface and the wireless network is encrypted.

11. The method of claim 8, further comprising providing access, by the computer system, to a second network coupled to the wireless network based at least in part on the file indicative of the previous acceptance of the terms of use.

12. The method of claim 8, further comprising receiving, by the computer system, a response indicating approval of the file.

13. The method of claim 8, the file indicative of the previous acceptance of the terms of use comprising a version number, a session identification, and a digital signature.

14. The method of claim 8, further comprising:
receiving, by the computer system, a response from the server indicating disapproval of the file;
at least partly in response to the disapproval, providing, by the computer system, a session identifier to the server via the connection;
receiving, by the computer system, a version of the terms of use associated with the use of the selected wireless network from the server via the connection;
presenting, by the computer system, at least a portion of the terms of use on the at least one output interface;
receiving, by the computer system, from the at least one user input interface, acceptance of the terms of use;
communicating, by the computer system, the acceptance to the server via the connection;
receiving, by the computer system, from the server via the connection, an updated file indicative of the acceptance; and
storing, by the computer system, the updated file indicative of the acceptance.

15. One or more non-transitory computer-readable storage media comprising computer-executable instructions that, when executed by one or more processors, configure the one or more processors to perform a method comprising:
receiving information associated with one or more wireless networks;
determining that a wireless network of the one or more wireless networks is designated for autoconnection, wherein the determination is based at least in part on identification, using the information, of a previous acceptance of terms of use associated with the wireless network;
associating at least one wireless network interface with the wireless network designated for autoconnection;
establishing, a connection via the at least one wireless network interface and the wireless network to a server; and
providing, by the computer system, to the server via the connection, a file indicative of the previous acceptance of the terms of use associated with the wireless network designated for autoconnection, wherein the file includes a version number associated with the previous acceptance of the terms of use.

16. The one or more non-transitory computer-readable storage media of claim 15, wherein the method further comprises receiving connection information designating the server from an access network query protocol transaction.

17. The one or more non-transitory computer-readable storage media of claim 15, wherein the connection between the at least one wireless network interface and the wireless network is encrypted.

18. The one or more non-transitory computer-readable storage media of claim 15, wherein the method further comprises providing access to a second network coupled to the wireless network based at least in part on the file indicative of acceptance.

19. The one or more non-transitory computer-readable storage media of claim 15, wherein the method further comprises receiving a response indicating approval of the file.

20. The one or more non-transitory computer-readable storage media of claim 15, wherein the file indicative of the previous acceptance of the terms of use comprises a version number, a session identification, and a digital signature.

* * * * *